United States Patent [19]
Sandor et al.

[11] 3,905,771
[45] Sept. 16, 1975

[54] APPARATUS FOR MEASURING THE DISSOCIATION RATIO OF AMMONIA

[75] Inventors: Vasile Sandor; Zoltan Kolozsvari, both of Tirgu Mures, Romania

[73] Assignee: Intreprinderea Industriala de Stat Methalothehnica, Tirgu Mures, Romania

[22] Filed: Apr. 16, 1973

[21] Appl. No.: 351,340

[52] U.S. Cl............ 23/254 E; 23/232 E; 23/255 E
[51] Int. Cl.² .................. G01N 27/56; G01N 27/30; G01N 27/06
[58] Field of Search ............. 23/232 E, 254 E, 230, 23/253, 255 E; 73/23, 26, 27 R; 204/1 T, 195 R; 324/71 R

[56] References Cited
UNITED STATES PATENTS

| | | | |
|---|---|---|---|
| 2,789,887 | 4/1957 | Cruikshank | 23/254 |
| 3,111,392 | 11/1963 | Stout, Jr. | 23/255 |
| 3,537,820 | 11/1970 | Markant et al. | 23/230 |

*Primary Examiner*—R. E. Serwin

[57] ABSTRACT

An instrument for measuring the ammonia dissociation ratio using a conductometric method based on the hydrolysis of undissociated ammonia in a constant gas volume. The disclosed apparatus has a transducer cell with two vertical electrodes, with gas and water inlets and outlets with electromagnetic valves controlling such inlets and outlets. The electrodes are connected to an AC supply and a current measuring instrument of the measuring circuit. The intensity of current flow between the electrodes will depend only on the height of ammonium hydroxide column resulting from the hydrolysis of ammonia, and is measured or recorded by common instruments. The apparatus may be employed to control the ammonia dissociation ratio by a suitable feedback method.

5 Claims, 1 Drawing Figure

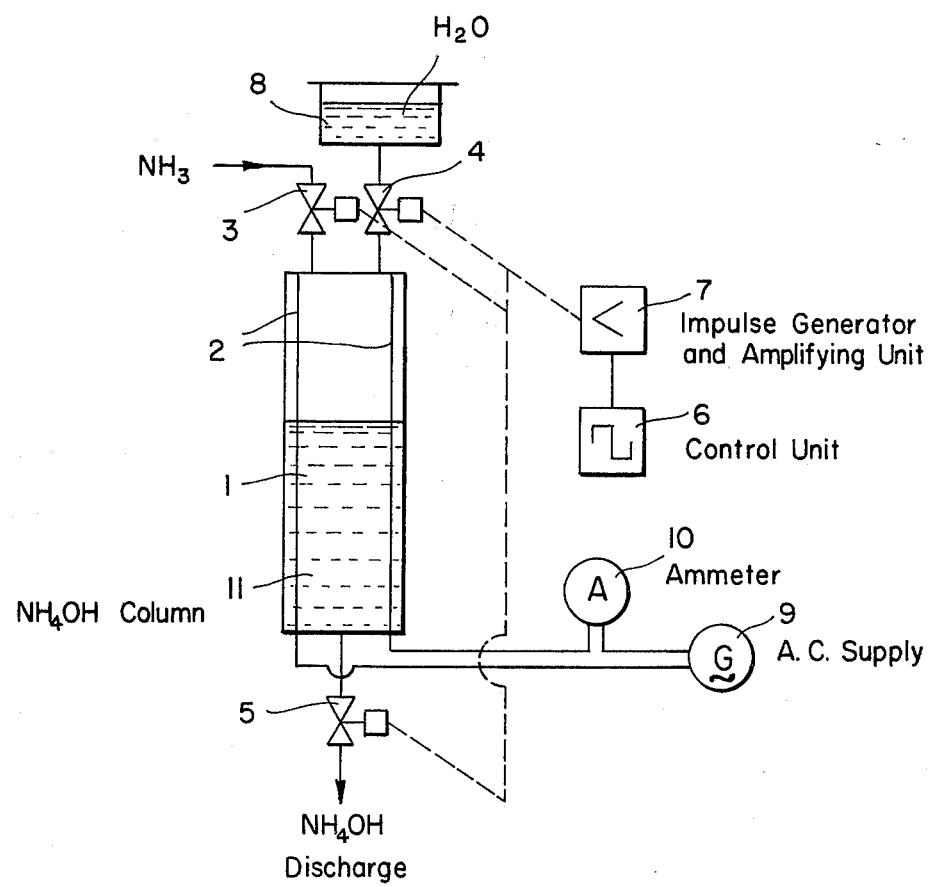

APPARATUS FOR MEASURING THE DISSOCIATION RATIO OF AMMONIA

This invention relates to an apparatus for measuring, recording and controlling the ammonia dissociation ratio by being a conductometric method based on the hydrolysis of undissociated ammonia in a constant gas volume.

A number of very different methods are used for measuring the ammonia dissociation ratio, such as (a) a spectroscopic method wherein the dissociation ratio is given by the intensity of hydrogen and nitrogen lines, (b) colorimetric and chromatographic methods, and (c) determining the ammonia dissociation ratio from quantitative analysis of gases.

All the above methods present the common disadvantage of the indirect measurement of the ammonia dissociation ratio with highly sophisticated instruments, raising difficulties in industrial applications.

The present invention eliminates all of the above drawbacks; it measures the ammonia dissociation ratio by determining the conductivity of a solution resulting from the hydrolysis of undissociated ammonia in a constant gas volume. The disclosed instrument includes a transducer cell with two vertical electrodes, the gas to be analyzed being introduced into such cell; the cell is connected to a water supply. The electrodes are connected to an AC generator assuring a current intensity as a function of the height of the column of ammonium hydroxide in the cell resulting from hydrolysis, which is measured by an ammeter or by common recording instruments.

The single FIGURE of the drawing is a schematic view in elevation of an apparatus in accordance with the invention.

The illustrated apparatus in accordance with the invention includes a transducer cell in the form of a cylindrical tube 1 of insulating material disposed in a vertical position. Two vertically spaced electrodes of stainless steel wire 2 insulated from each other are disposed along opposite sides of the tube. At the upper end of the tube 1 there are gas and water inlet conduits, such conduits being provided with electromagnetic valves 3 and 4, respectively. A discharge conduit is privided at the bottom of cell 1, such discharge conduit being provided with an electromagnetically controlled valve 5. Water to be admitted to cell 1 is contained in a tank 8.

A time-based control unit 6 is connected to an impulse generator and amplifying unit 7 which controls the electromagnetic valves 3, 4, and 5. The water admission is assured by the hydrolysis of ammonia which occurs immediately upon contact of the ammonia with water. The water admission is ended when the whole quantity of ammonia has been transformed into ammonium hydroxide.

A highly stabilized AC current from a supply unit 9 of the measuring circuit is connected to the electrodes 2 thus giving an intensity of current flow between electrodes which is proportional to the undissociated ammonia; such current flow is measured by the instrument 10. The height of the ammonium hydroxide column 11 in cell 1 depends on the quantity of ammonia in the cell 1 and the higher the solution level, the smaller is the resistivity of the cell.

The instrument has an intermittent operation, a complete cycle being made, for example, every minute. As a first step the gas being analyzed moves across the transducer cell 1, the gas inlet valve 3 being open and the water inlet valve 4 being closed. The timebase of the control unit 6 assures a cycle time enough for a perfect washing of the cell with the gas to be analyzed. In the next step the cycle control of electromagnetic valves composed of the impulse generator and amplifier unit 7 controls the opening of water inlet valve 3 and the closing of gas inlet valve 3 as well as the waste-outlet valve 5, the cell 1 being connected to the water tank 8. As above disclosed, water admission is assured by the hydrolysis of ammonia. The water admission ends when the whole quantity of ammonia has been transformed into ammonium hydroxide 11.

The concentration of $NH_4OH$ and its specific conductivity remains always the same during the measurements, the only factor to influence the total conductivity of the cell being the height of the ammonium hydroxide column 11. The read-out instrument (ammeter 10) is preferably calibrated for being read directly in the degree of dissociation of ammonia.

After a complete measuring cycle has been conducted, the control unit assures the return of the valves 3, 4, and 5 to their initial positions so that the transducer cell 1 will be ready for starting a new cycle by evacuating the $NH_4OH$ from the cell 1 and introducing the new gas to be analyzed.

Advantages of the apparatus in conformity with the invention are that it includes solid-state control units which are easy to operate. The apparatus has no moving parts, has high sensitivity, and may readily be automated. The apparatus may be operated at a distance (telemetering), and is insensitive to variations of gas flow rate, gas pressure, and gas temperature.

Although the invention is illustrated and described with reference to a single preferred embodiment thereof, it is to be expressly understood that it is in no way limited to the disclosure of such a preferred embodiments, but is capable of numerous modifications within the scope of the appended claims.

What is claimed is:

1. Apparatus for measuring the dissociation ratio of ammonia comprising a cell, two spaced electrodes in said cell, means to introduce into the cell a quantity of water proportional to the portion of the introduced ammonia that remains undissociated upon the contact of the ammonia with the water to form in said cell a column of ammonium hydroxide whose height is indicative of such undissociated portion, a source of electric current, means to connect said electrodes to said current source to subject the electrodes to respectively opposite polarities, and means to measure the intensity of current flow between the electrodes through the column of ammonium hydroxide in the cell, whereby said intensity is proportional to the undissociated portion of the ammonia.

2. Apparatus according to claim 1, wherein the cell is elongated vertically, and the electrodes are disposed vertically.

3. Apparatus according to claim 1, wherein the source of electric current is an alternating current source.

4. Apparatus according to claim 1, wherein the electrodes, the source of electric current, and the current measuring means are connected in series.

5. Apparatus according to claim 1, comprising control means for operating the apparatus cyclically on a time base.

* * * * *